United States Patent [19]

O'Brien et al.

[11] 3,757,297

[45] Sept. 4, 1973

[54] BATCH TOTAL ACCUMULATOR FOR CARD PUNCH

[75] Inventors: Daniel M. O'Brien, Tustin; Clarence G. McCune, Balboa, both of Calif.

[73] Assignee: California Computer Products, Inc., Anaheim, Calif.

[22] Filed: Feb. 9, 1972

[21] Appl. No.: 224,782

[52] U.S. Cl. .................. 340/146.1 AB, 235/153 AS

[51] Int. Cl. .......................................... G06f 11/02

[58] Field of Search ................ 235/61.11 R, 61.6 R, 235/153 AM, 153 AS; 340/146.1 AB, 172.5

[56] References Cited

UNITED STATES PATENTS

| | | | |
|---|---|---|---|
| 3,303,462 | 2/1967 | Dotter | 340/146.1 AB |
| 3,337,864 | 8/1967 | Lender | 340/146.1 AB |
| 3,439,330 | 4/1969 | Sipress et al. | 340/146.1 AB |
| 3,611,141 | 10/1971 | Waters | 340/146.1 AB |

*Primary Examiner*—Charles E. Atkinson
*Attorney*—John A. Duffy and Bruce D. Jimerson

[57] ABSTRACT

Special instructions can be used to effect transfer between accumulator registers or algebraic addition of accumulated values to achieve a zero balance condition in the keying station without changing the existing form of the data on the punched card.

5 Claims, 8 Drawing Figures

PATENTED SEP 4 1973 3,757,297

SHEET 4 OF 7

BATCH TOTAL ACCUMULATOR FOR CARD PUNCH

BACKGROUND OF THE INVENTION

Reference is made to U.S. Pat. No. 3,597,592 and application Ser. No. 47,215, now U.S. Pat. No. 3,667,668. This invention relates generally to improvements in an information entry system of the type described in the above referenced patent and patent application, the contents of which are incorporated by reference as background information for the invention described herein. The time and extra keystrokes required in present methods of batch totalling and the chance of error resulting from having to punch and discard special cards can be greatly decreased if means are provided for changing data keyed into a record from a negative amount to a positive amount or vice versa without changing the existing way it is entered upon the individual record. In conjunction therewith, it is advantageous to provide special instructions for, 1 transferring values between different accumulator registers, and 2 to test, without outputting a card, to determine whether the amounts accumulated in different accumulators are equal to zero.

Accordingly, it is a primary object of the present invention to provide a means for accumulating positive or negative amounts in either of two registers to assure the accuracy of keyed data by balancing to a predetermined total or to zero.

A further object of the present invention is to provide a means for changing keyed data to a negative or positive amount for algebraic accumulation without changing the form that it is punched onto a record card.

It is another object of the present invention to provide a means of copying field data from one accumulator register to another.

It is another object of the invention to provide a means for testing whether the contents of one or more accumulations is equal to zero.

It is another object of the invention to provide a means for carrying out the above functions by program instruction.

Other objects and advantages of the present invention will be obvious from the detailed description of a preferred embodiment given herein below.

SUMMARY OF THE INVENTION

The present invention comprises logic means which may be added to an existing card punch system of the type described in the aforementioned patent and patent application by Graves, Vincer and McCune. The added logic is typically incorporated to function in combination with the existing circuitry, or modify the functions of existing circuitry, so as to allow the operator to program the card punch system to automatically invert the polarity of data to be accumulated in either of two registers from the polarity of the data being punched into the record card; to automatically transfer field data from one register to another; and to automatically test for a zero balance condition in either of two registers and indicate an error condition in the event the balance is not equal to zero.

DETAILED DESCRIPTION OF A PREFERRED EMBODIMENT

Figure 1A:
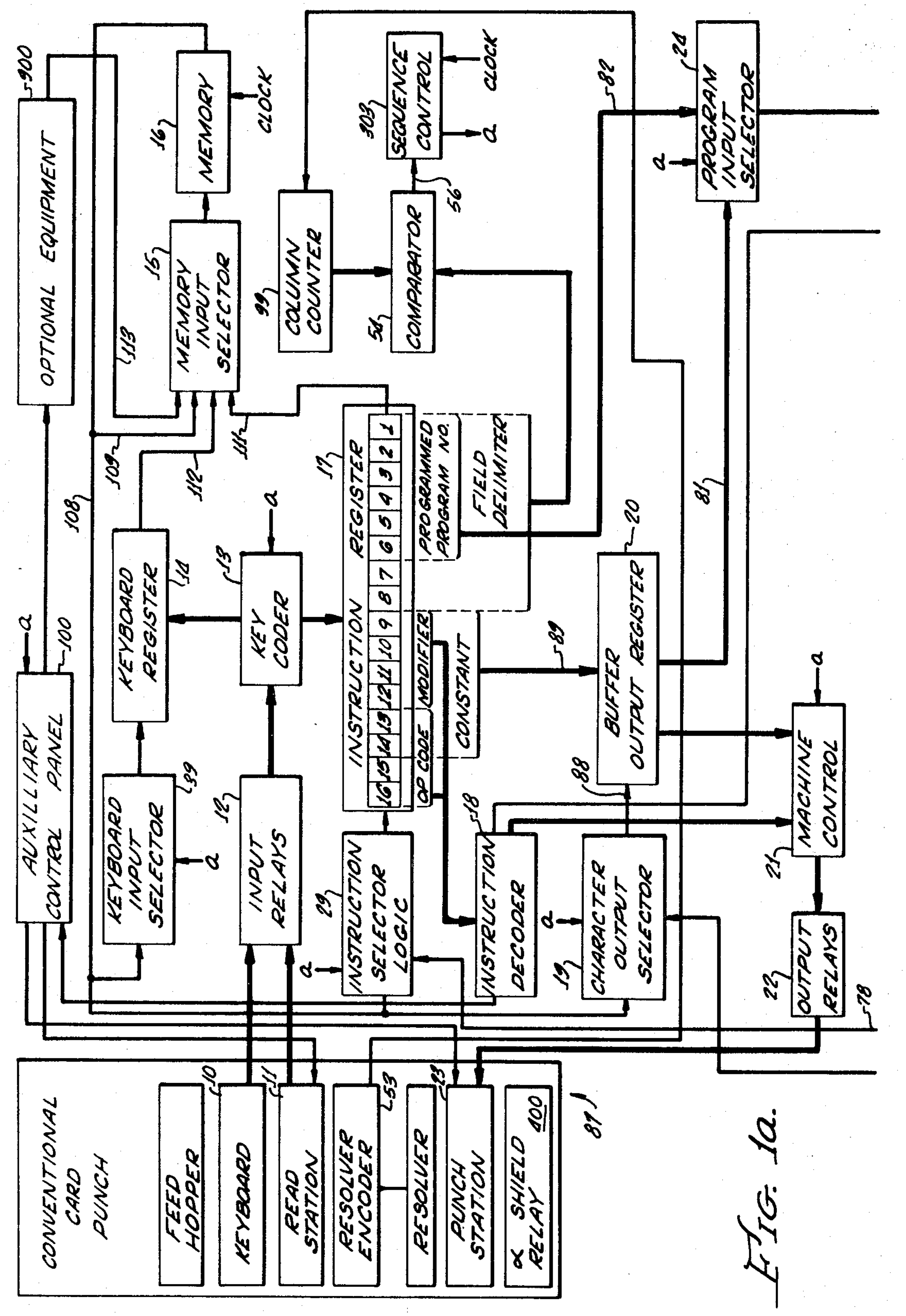
FIGS. 1*a* and 1*b* show the functional relationship of the operative elements of a stored program card punch system.
Figure 1C:
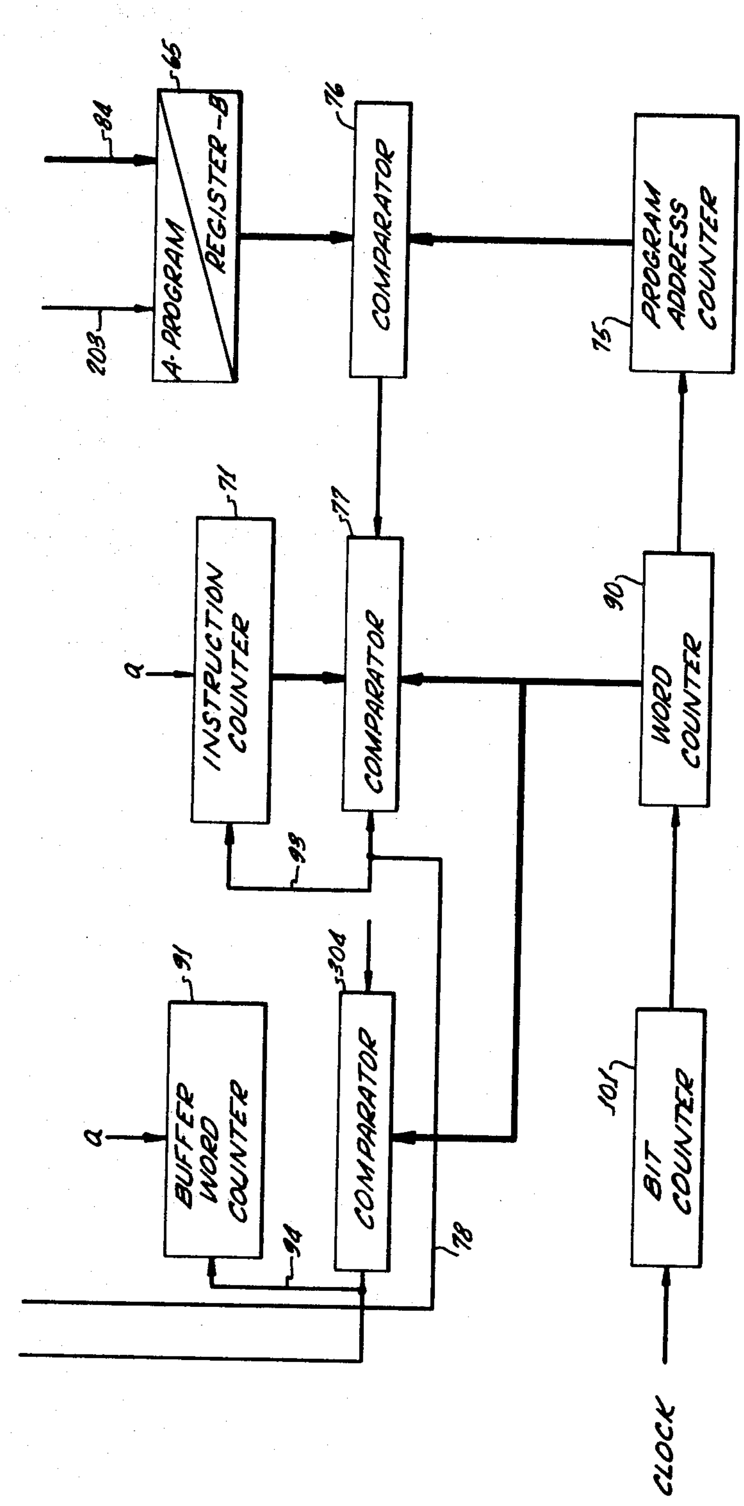

FIG. 1 shows the inter-relationship of the various elements of a card punch machine as described in the aforementioned patent application. The keyboard 10 is a standard part of a card punch machine. Each key mechanically closes an electrical contact. The keyboard 10 functions in a dual mode: 1) As a means for entering alphanumeric data on a batch of cards which are punched in accordance with the particular keystroke; and 2) to select a desired program stored in memory, or to erase data in the buffer, or to enter special operating modes.

The read station 11 is also part of a standard card punch machine comprising a set of mechanical fingers or photocells for determining the presence or absence of a hole (i.e., a punch) at a particular location on the card being read.

The input relays 12 function to provide isolation between the conventional card punch machine and the other elements of the system.

The keycoder 13 operates on the signals received from the input relays to encode the signals from either input 10 or 11.

The keyboard input selector 39 closes the loop to enter keyboard register data into the memory 16. Synchronization of the keyboard input selector with the memory is accomplished by the sequence control unit 303 to be described below.

The keyboard register 14 is an 8-bit FLIP-FLOP shift register. Information is entered in parallel and shifted out serially.

The memory input selector 15 operates to circulate data in the dynamic memory 16 (path 109) or to enter new information into the memory 16 from either the keyboard register 14 (path 112) or the instruction register 17 (path 111) or the optional equipment 900 (path 113).

The dynamic memory 16 is divided into two parts. In one part of the memory, called the "buffer", only characters are stored. This buffer part is capable of storing the alpha and numeric code for 31 characters having 16 bits each. The remaining part of the memory is used to store up to 22 programs, each of which may have as many as 16 instructions. Each instruction is 16 bits.

The instruction register 17 is a 16 bit FLIP-FLOP Input/Output register, serial or parallel input, serial or parallel output. The instruction register 17 communicates with other elements in various ways depending upon the type of instruction.

The instruction decoder 18 generates a signal on one of ten lines in accordance with the state of instruction register bits 16–13.

The buffer output register 20 is an eight-bit register capable of receiving information in serial (path 88) or parallel (path 89) and outputting in parallel.

The machine control 21 is used to drive interposers at the punch station 23 via the output relays 22.

The program input selector 24 selects programs in either one of two different ways, i.e., it determines whether the program registers 65 are loaded with the contents of the buffer output register 20 or with a program number specified by the last six bits of an instruction.

The program register 65 comprise two separate six-bit registers A and B. A program may be selected either automatically or manually. In either case, the program number is loaded into register A. Before execution is initiated, this number is also copied into register B where it is retained until completely and correctly punched.

A particular address in memory is located by a series of counters (101, 90 and 75) which are incremented in sync with the memory 16. The state of the various counters are compared with the contents of the various registers to determine the location (in a time sense) of each piece of stored data.

The instruction select logic 29 inhibits the serial shifting of the instruction register 17 while a field instruction is being carried out — until a signal is received from the sequence control 303. 6

The sequence control 303 functions to monitor the status of signals from other function groups and gate control signals to effect the following operational routines: read program; select program; execute program; buffer keystrokes.

The auxiliary control panel 100, in addition to the power switch and power indicator light, includes an error indicator light, a program select indicator light, a "reader on" switch, and a reader on light. The indicator lights are actuated by signals from the sequence control 303 and instruction decoder 18, the primary purpose being to inform the operator of various conditions which may occur during operation of the machine.

The accumulator option in the original disclosure U.S. Pat. No. 3,597,592 and application Ser. No. 47,215) comprised a plug-in element (three extra circuit cards) that provide two separate accumulators by which to total independently the contents of two left zero fields. Program address 22 in the memory 16 is used to store the accumulated amounts when the accumulator option is used, in which case the operator can only store 21 programs. The additional cards included the logic for the addition, and memory address 22 provides the storage for one or two accumulated totals. The interconnecting loop is indicated by the path 113.

Under the improvements which constitute the essence of the present invention, an additional instruction (preceding the accumulate instruction) is utilized to change the state of a special subtract FLIP FLOP, reversing the sign of data keyed into a record from a negative amount to a positive amount — or vice versa — without changing the existing way it is entered into the individual record.

Figure 2:
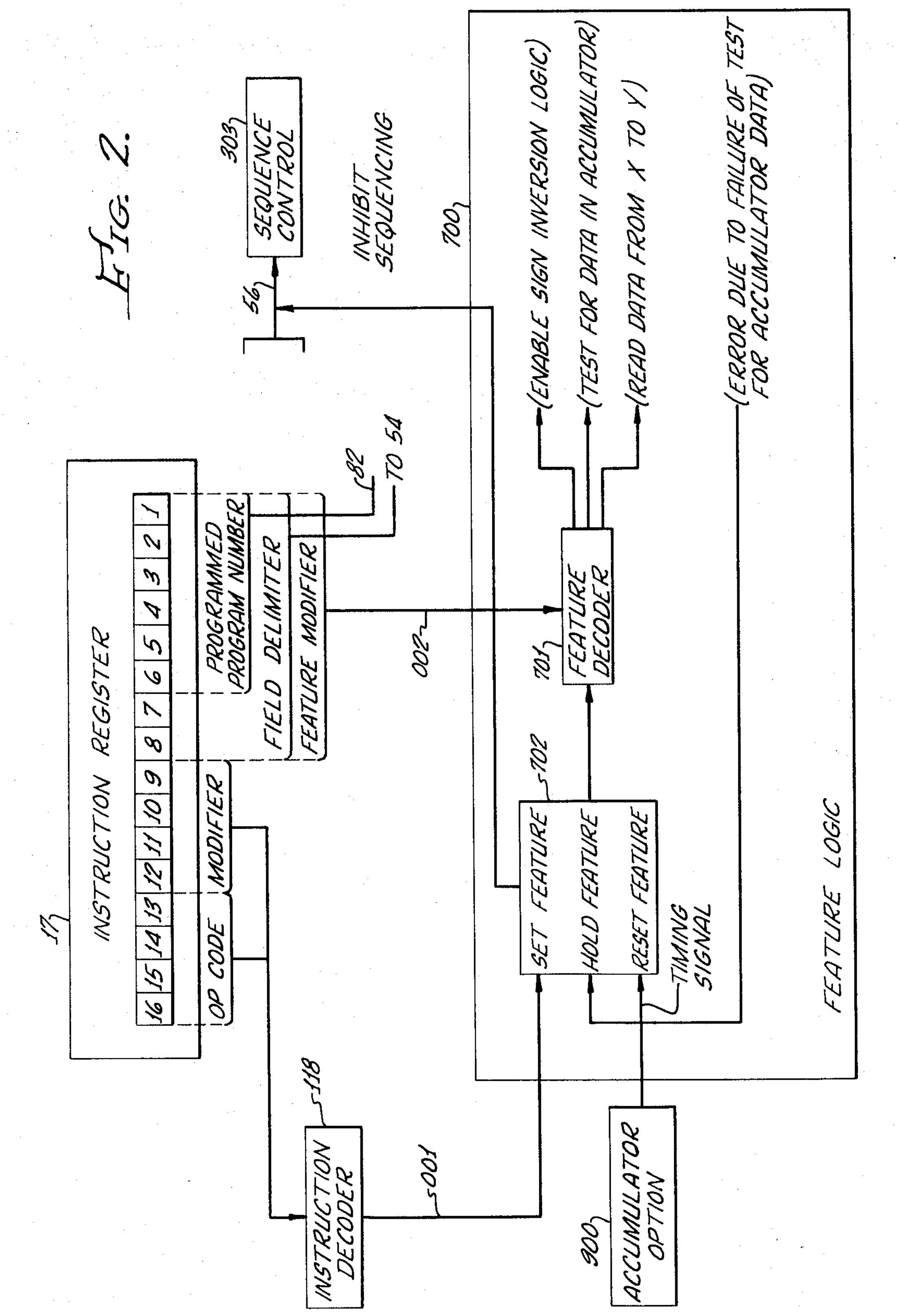
FIG. 2 shows a block diagram of the interrelationship of the feature logic and the instruction register.

Referring to FIG. 2, the instruction is decoded by a combination of signals from the Instruction Register 17, via paths 001 and 002 and gates 702, to the Feature Decoder 701.

Figure 3:
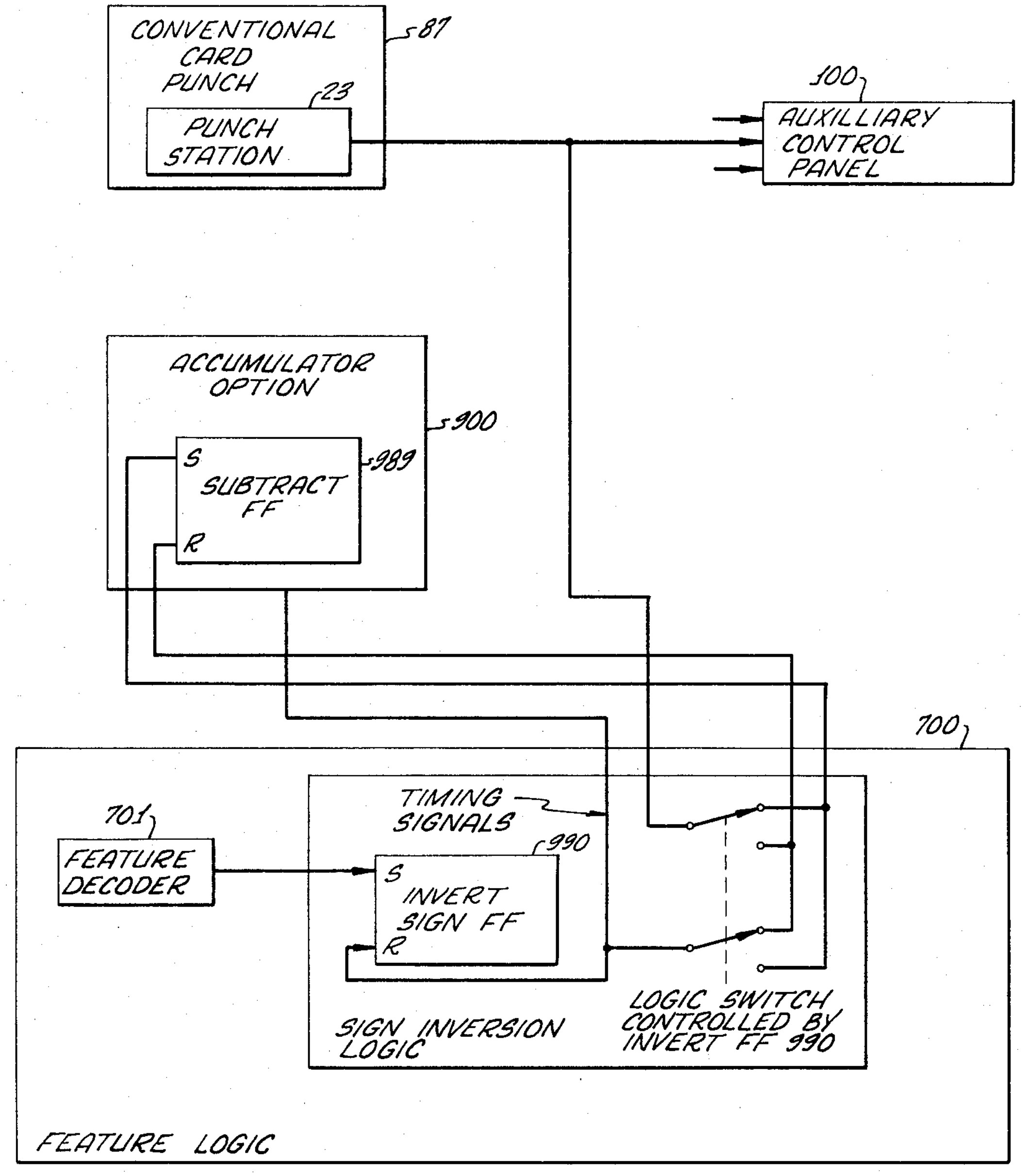
FIG. 3 is a block diagram showing how the instruction is decoded to set the subtract FLIP FLOP.

FIG. 3 shows how the instruction is decoded to set the Invert Sign FLIP FLOP 990 which causes the subtract FLIP FLOP 989 to set upon instruction decoding of the next accumulate instruction. The subtract FLIP FLOP 989 causes a negative sign to accompany the next amount that is read into the accumulator. The subtract FLIP FLOP 989 is reset upon detection of the "Eleven Interposer" at the punch station 23 (indicating that a negative amount is being entered into the individual record and causing a positive sign to accompany the amount being read into the accumulator, or is reset when the accumulator instruction is completed.) The feature logic 700 is thus able to invert the sign, allowing a balance to zero, while the non-inverted amount is punched onto the detail card. To illustrate further assume that an operator knows the algebraic sum of the field data in advance, e.g., as a result of an adding machine calculation. He may be required, by procedure, to punch that total into a card (called the batch total card) and then to punch each of the detailed cards. The most desirous method to verify that the sum of the individual detail card amounts is in balance with the batch total amount is by use of the Zero Balance Method, i.e., by first entering the inverse batch total amount into the accumulator then reducing this amount, by the individual detail amounts, to zero. If, however, the operator has no way of inverting the signs of these operations (as is the case in prior art systems) and wishes to use the Zero Balance Method, he must avoid accumulating the amount punched into the batch total card and must prepare a second (batch total) card, crediting the total amount and causing this amount to be entered into the accumulator. This card is of no further value to the operator. It must be removed from the deck of punched cards and be discarded. Using the present invention, he simply punches one batch total card followed by the detail cards, then proceeds to the next batch. The instruction in his batch total card program will invert the total amount as it is read into the accumulator, as was previously described, and the detail amounts will reduce the accumulated total to zero. The resulting zero will be verified by a second special instruction. If the accumulation is not zero, an error situation will be indicated to the operator upon operation of the second special instruction, which is next described.

Figure 4:
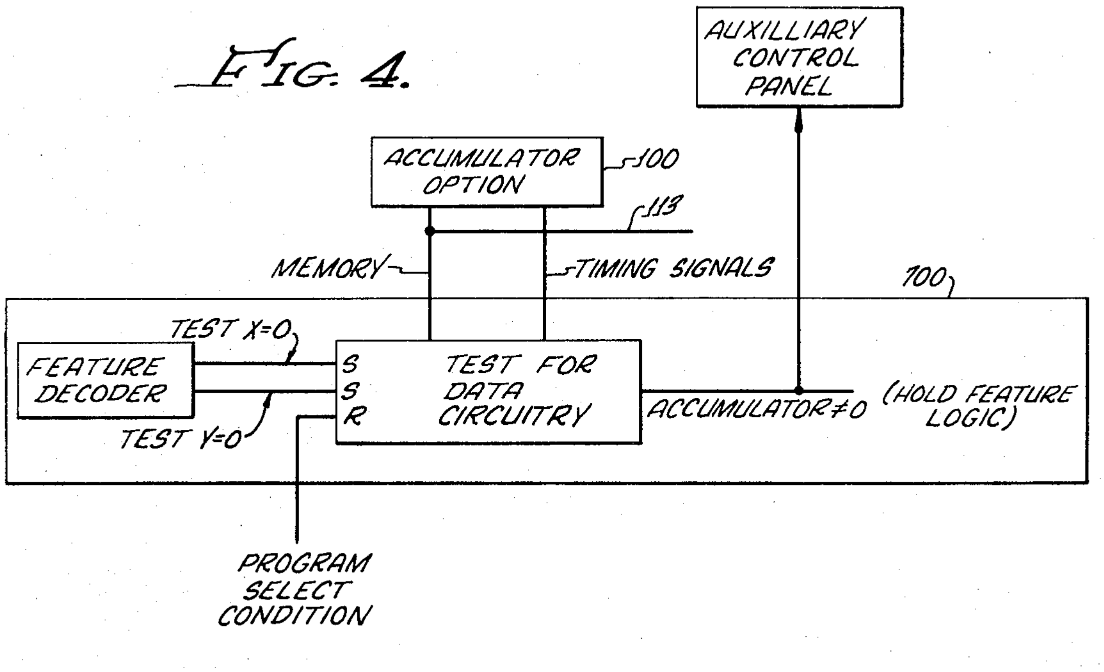
FIG. 4 shows in block diagram form the state of the various elements when a zero accumulator instruction is decoded.

The second special instruction will normally be written into the operating program(s) so as to occur prior to the instruction which controls loading the first of a series of amounts, whose sum total is zero, into an accumulator register and prior to card punch machine operation on the card which is to receive punches for the first accumulated amount. Referring to FIG. 4, upon operation of this instruction, decoded by the Feature Decoder, the feature logic 700 will ascertain that there is no data remaining in the designated accumulator by monitoring data on the memory line 113 at the appropriate time. If no data remains in the accumulator location of the memory, the previous batch is in balance and operation on the new batch is allowed to proceed as programmed. If, on the other hand, data was found to exist in the designated accumulator by the feature logic 700 then an error situation would be indicated to the operator in two ways:

1) The error indicator light on the Auxiliary Control Panel 100, would be caused to light;

2) Further operation of the program would be inhibited. These indications will persist until the operator causes a Program Select condition to occur by operation of the PROG ONE and PROG TWO keys or the CLEAR switch which reset the feature logic 700.

To illustrate a third feature of the invention, consider a situation where an operator is required to punch a batch of receipts from a number of separate sources. In this case the operator would like to accumulate the batch total in one accumulator (X) and the source totals in a second accumulator (Y) in order to verify that the amounts punched into the cards for a given source are in balance with the accounting tape that accompanies the receipts for that source and that the amounts punched into the source total cards (whose sum is the batch total) is in balance with the batch total indicated on the accounting tape which accompanies the batch. Again, the Zero Balance Method is the preferred method. To accomplish the simultaneous verification of both the batch total and the individual sub-totals it is necessary to accumulate either the individual subtotal amounts or the individual detail amounts into both accumulators at one time, which is the goal of this third feature. Loading an amount into both accumulators is accomplished by loading the amount into the X accumulator register followed by a special instruction, decoded by the Feature Decoder — which causes data in the X accumulator register to be non-descructively read into the Y accumulator register prior to the time at which actual accumulation occurs.

Figure 5:
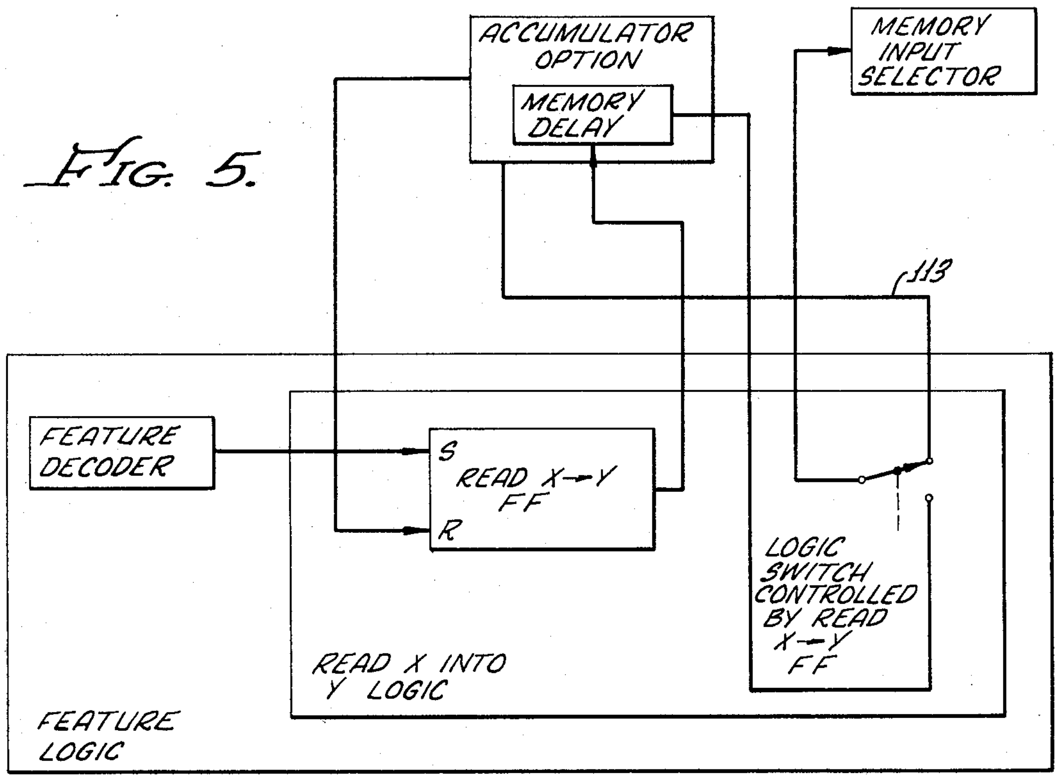
FIG. 5 shows a block diagram of how data is transferred between the two accumulators.

Referring to FIG. 5, data stored in the X accumulator is read from the memory line 113 and is stored in the memory delay. The Y accumulator portion of the memory is erased and X accumulator information is written in its place from the memory delay.

Figure 6A:
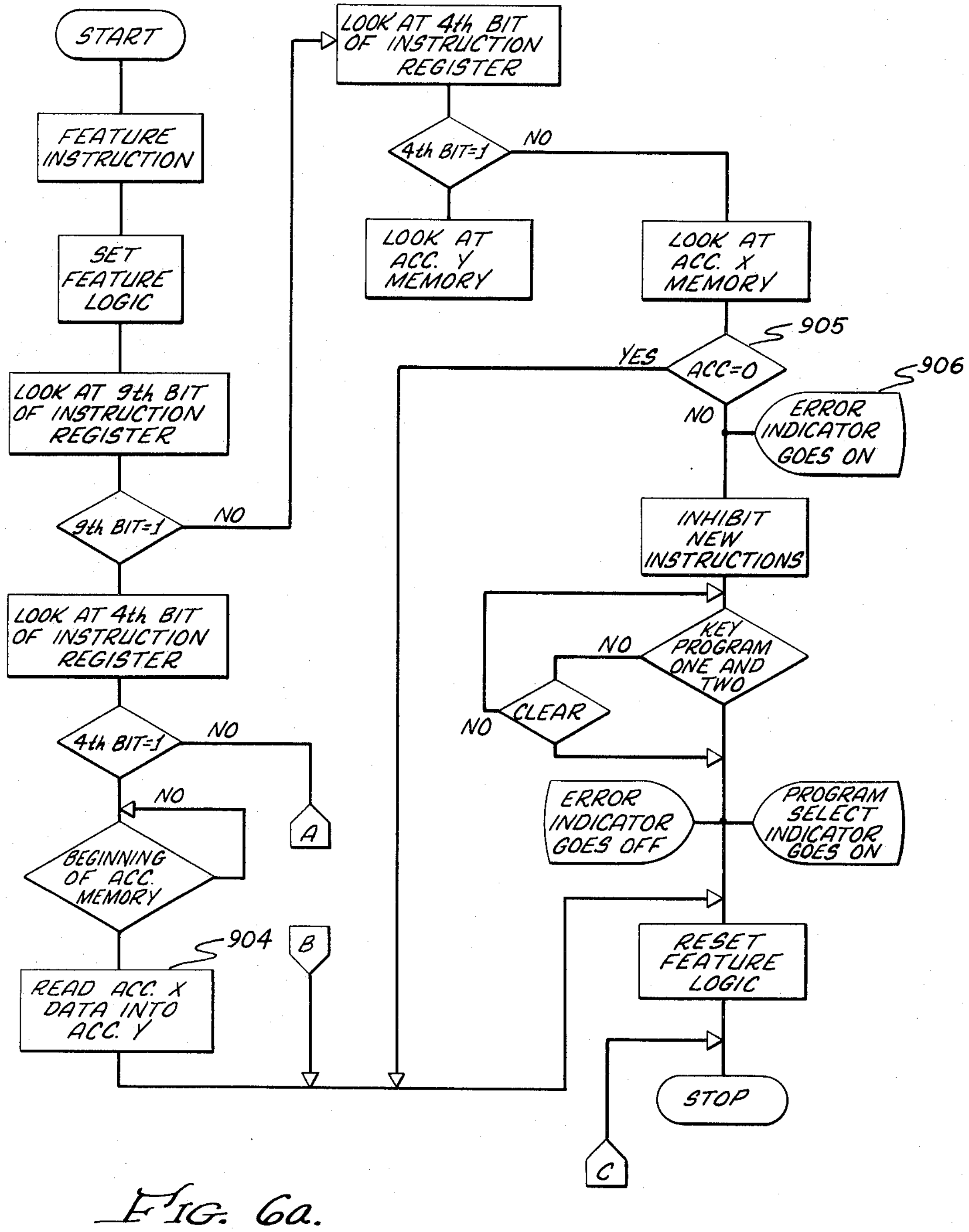
FIGS. 6*a* and 6*b* show a flow chart which summarizes the decisional paths involved in the various aspects of the invention.
Figure 6B:
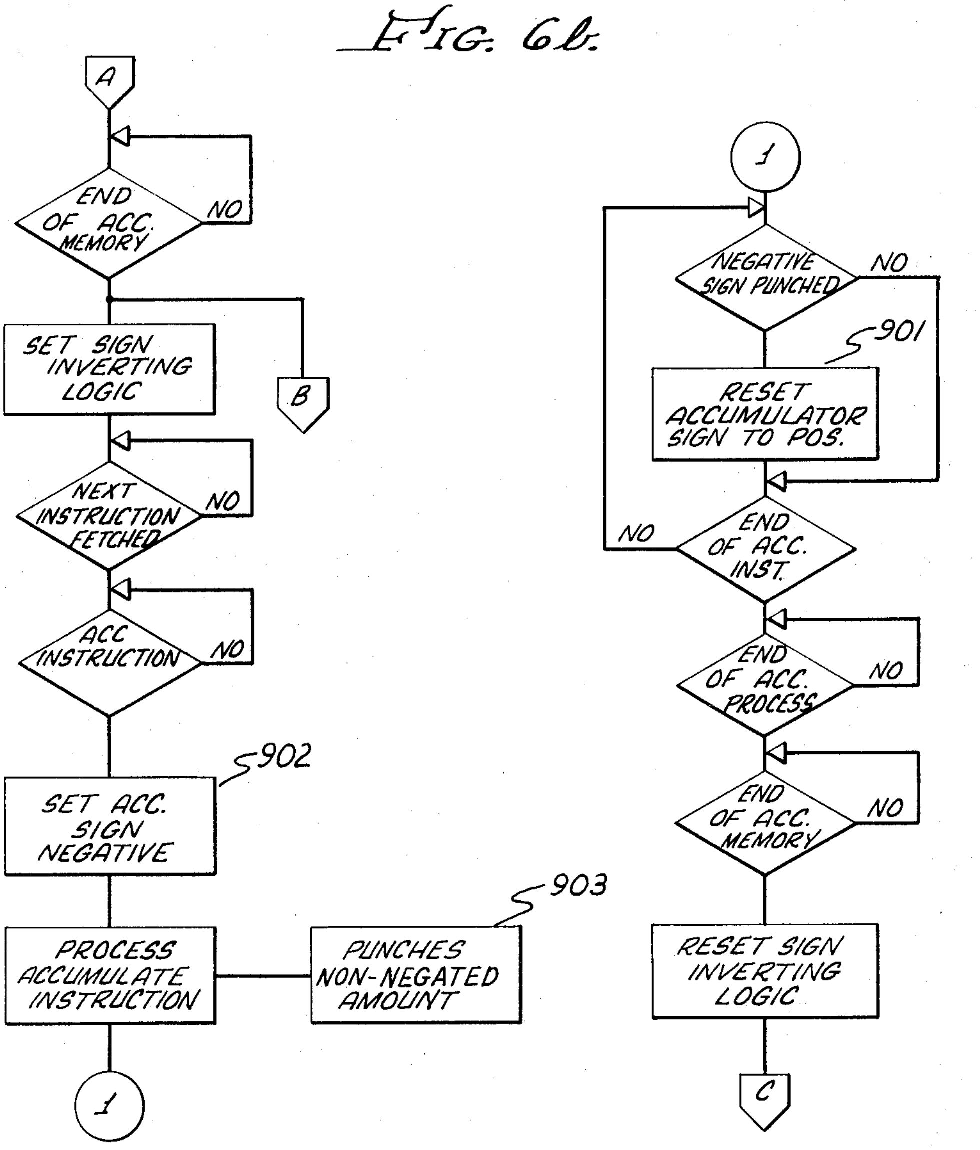

FIGS. 6*a* and 6*b* show a flow diagram summarizing the various aspects of the invention. With the aid of the additional instructions and logic, an operator can change data keyed into a card from a negative to a positive amount (901) or vice versa (902) without changing the existing way it is entered into the individual record (903) to provide a method of arriving at zero balance in the keying station. In addition, the operator can enter field data into both of two accumulators (904) for the purpose of maintaining both a subtotal accumulation and a master batch total accumulation simultaneously. The operator can, without outputting a card, test by instruction whether the amounts accumulated in either or both accumulators are equal to zero (905) or other than zero, in which case an error is indicated (906).

It will be evident that the invention is not limited to any particular circuitry or combination — and that the basic concept of the invention may be applied to recording data on other media. It will thus be understood that numerous changes, modifications, and substitutions may be made without departing from the spirit of the invention.

We claim:

1. A card punch system of the type having a punch station, a memory for buffering keystrokes, an instruction register for temporarily storing an instruction and a plurality of accumulators for batch totalling wherein is included:

decoding means responsive to said instruction register for determining when the sign of data entering an accumulator is to be reversed;

logic means responsively interconnected to said decoding means and said accumulators for reversing the data entering an accumulator without changing the form of the data punched.

2. The system recited in claim 1 wherein is included:

means for copying field data from one accumulator register to another by program instruction, said means comprising:

delay memory means responsively interconnected between two accumulators for temporarily storing data read from one accumulator register, and means for transferring the data stored in said delay memory to the other of the two accumulators,

3. The system recited in claim 1 wherein is included:

means for accumulating positive or negative amounts in said accumulators and, means for balancing said accumulators to a predetermined total.

4. The system recited in claim 1 wherein is included:

means for testing whether the contents of one or more accumulations is equal to zero, said means comprising:

a program instruction;

means responsive to said instruction register for indicating an error when an accumulation is other than zero.

5. The apparatus recited in claim 4 wherein is included:

inhibiting means responsive to said error indicating means for preventing execution of further instruction when an error is detected.

* * * * *